US010178166B2

(12) United States Patent
Sharan

(10) Patent No.: US 10,178,166 B2
(45) Date of Patent: Jan. 8, 2019

(54) DELIVERING PERSONALIZED CONTENT TO AUTHENTICATED USER DEVICES

(71) Applicant: eBay Inc., San Jose, CA (US)

(72) Inventor: Yotam Sharan, Ramat-Gan (IL)

(73) Assignee: eBay Inc., San Jose, CA (US)

(*) Notice: Subject to any disclaimer, the term of this patent is extended or adjusted under 35 U.S.C. 154(b) by 41 days.

(21) Appl. No.: 14/563,078

(22) Filed: Dec. 8, 2014

(65) Prior Publication Data

US 2016/0164958 A1 Jun. 9, 2016

(51) Int. Cl.
G06F 17/30 (2006.01)
H04L 29/08 (2006.01)
G06Q 30/02 (2012.01)
H04L 29/06 (2006.01)
H04W 12/06 (2009.01)

(52) U.S. Cl.
CPC ....... H04L 67/104 (2013.01); G06Q 30/0261 (2013.01); G06Q 30/0267 (2013.01); G06Q 30/0269 (2013.01); H04L 63/0823 (2013.01); H04L 63/0876 (2013.01); H04L 67/306 (2013.01); H04W 12/06 (2013.01); H04L 63/083 (2013.01)

(58) Field of Classification Search
CPC ......... G06F 17/30035; G06F 17/30841; G06F 17/30047; G06F 17/30247; G06F 17/30879
USPC .......................................................... 726/7
See application file for complete search history.

(56) References Cited

U.S. PATENT DOCUMENTS 8,540,149 B1* 9/2013 Chu ..................... G07G 1/0045 235/375
8,583,723 B2* 11/2013 Stewart ............... G06Q 10/107 709/201
8,668,144 B2* 3/2014 Evevsky ................ G06F 21/31 235/380
2002/0169623 A1* 11/2002 Call ....................... G06Q 30/02 705/5

(Continued)

FOREIGN PATENT DOCUMENTS

WO WO-2016094279 A1 6/2016

OTHER PUBLICATIONS

Huang et al, QR code Data Type Encoding for Ubiquitos Information Transfer Across Different Platforms, 2009, IEEE, pp. 292-297.*

(Continued)

Primary Examiner — Luu T Pham
Assistant Examiner — Jenise E Jackson
(74) Attorney, Agent, or Firm — Wolfe-SBMC/eBay

(57) ABSTRACT

Techniques for generated scannable coded images or user actionable-link with corresponding personalized content are described. In an example embodiment, the personalized content may only be accessed via the scannable coded image by authenticated user devices, wherein the permissions associated with the authentication are determined at the time the personalized content is generated. Responsive to a user device attempting to access the contents of a scannable coded image, the user device is first identified and authenticated. Only after the device is authenticated can the content corresponding to the scannable coded image be accessed by the user device or delivered to the user device.

17 Claims, 9 Drawing Sheets

(56) References Cited

U.S. PATENT DOCUMENTS

| | | | |
|---|---|---|---|
| 2005/0138410 A1* | 6/2005 | Masuouka | G06F 21/42 726/3 |
| 2007/0083441 A1 | 4/2007 | Harper et al. | |
| 2007/0136202 A1* | 6/2007 | Noma | G06Q 99/00 705/51 |
| 2009/0132813 A1* | 5/2009 | Schibuk | G06Q 20/223 713/158 |
| 2009/0248520 A1* | 10/2009 | Ku | G06Q 20/102 705/14.39 |
| 2010/0280964 A1* | 11/2010 | Register, Jr. | G06Q 30/018 705/317 |
| 2012/0209686 A1 | 8/2012 | Horowitz et al. | |
| 2012/0266258 A1* | 10/2012 | Tuchman | H04L 63/104 726/28 |
| 2012/0273576 A1* | 11/2012 | Tomczyk | G09F 3/0292 235/488 |
| 2012/0284132 A1* | 11/2012 | Kim | G07G 1/0081 705/20 |
| 2013/0037608 A1* | 2/2013 | Evevsky | G06F 21/31 235/380 |
| 2013/0091545 A1 | 4/2013 | Macdonald et al. | |
| 2013/0111208 A1* | 5/2013 | Sabin | G06F 21/35 713/171 |
| 2013/0126599 A1 | 5/2013 | Soske et al. | |
| 2013/0193200 A1* | 8/2013 | O'Connor | G06Q 30/0281 235/375 |
| 2014/0034722 A1 | 2/2014 | Han | |
| 2014/0143055 A1* | 5/2014 | Johnson | G06Q 30/0257 705/14.55 |
| 2014/0230039 A1* | 8/2014 | Prakash | G06F 21/35 726/9 |
| 2014/0317266 A1* | 10/2014 | Fuchs | G06Q 30/02 709/224 |
| 2015/0066798 A1* | 3/2015 | Gillen | G06Q 10/0835 705/336 |
| 2015/0134552 A1* | 5/2015 | Engels | H04W 4/80 705/318 |
| 2015/0136846 A1* | 5/2015 | Burkhart | G06K 19/06037 235/375 |
| 2015/0156198 A1* | 6/2015 | Sabin | G06F 21/35 713/176 |
| 2015/0178721 A1* | 6/2015 | Pandiarajan | G06Q 20/382 705/75 |
| 2015/0228148 A1* | 8/2015 | Barnes | G07F 17/32 463/17 |
| 2015/0244715 A1* | 8/2015 | Narayan | G06F 21/44 726/5 |
| 2015/0248663 A1* | 9/2015 | Meere | G06Q 20/3274 705/17 |
| 2015/0324863 A1* | 11/2015 | Pugh | G06Q 30/0226 705/14.27 |
| 2015/0326565 A1* | 11/2015 | Kuang | G06F 21/34 726/4 |
| 2015/0356607 A1* | 12/2015 | Civanlar | G06Q 30/0261 705/14.58 |
| 2016/0005230 A1* | 1/2016 | Asselin | G06T 19/006 463/31 |
| 2016/0007150 A1* | 1/2016 | Finlow-Bates | H04W 64/00 705/14.58 |
| 2016/0048604 A1* | 2/2016 | Kandregula | G06Q 30/0241 235/375 |
| 2016/0132704 A1* | 5/2016 | Engels | H04W 4/80 340/10.42 |
| 2016/0155036 A1* | 6/2016 | Burkhart | G06K 19/06037 235/494 |

OTHER PUBLICATIONS

Nurwono et al, Color Quick Response Code for Mobile Content Distribution, 2009, ACM, pp. 267-271.*

"International Application Serial No. PCT/US2015/064218, International Search Report dated Feb. 3, 2016", 2 pgs.

"International Application Serial No. PCT/US2015/064218, Written Opinion dated Feb. 3, 2016", 5 pgs.

"International Application Serial No. PCT/US2015/064218, International Preliminary Report on Patentability dated Jun. 22, 2017", 7 pgs.

* cited by examiner

| CODED IMAGE | USER ID | CONTENT |
|---|---|---|
| QR 1 | USER ID1 | CONTENT A |
| QR 1 | USER ID2 | CONTENT B |
| QR 1 | USER ID3 | CONTENT C |
| QR 2 | USER ID1 | CONTENT D |
| QR 3 | USER ID4 | CONTENT E |
| QR 4 | USER ID5 | DYNAMIC SCRIPT |

*FIG. 7*

DELIVERING PERSONALIZED CONTENT TO AUTHENTICATED USER DEVICES

TECHNICAL FIELD

This application relates to data processing. In particular, example embodiments may relate to systems and methods for personalizing content based on identification of a user device.

BACKGROUND

A barcode is an optical machine-readable representation of data relating to the object to which it is attached. The use of barcodes has grown over the years as a means for providing direct access via a scannable coded image to a website or other information that is embedded within the coded image. With most personal devices now including a camera, a display and code scanner applications, the exchange of data via image capture is possible.

A quick response (QR) code is a type of two-dimensional barcode or matrix that allows interested parties to access information or a specific URL by simply scanning the code with an enabled device. The information encoded can be text, uniform resource locator (URL), or other data. Although initially used for tracking parts in manufacturing processes, QR codes are now used in a much broader context including content delivery to enabled personal devices. For example, QR codes can be used to display text to a user, open a URL, or to compose a text or email. Users with a personal device equipped with the correct scanner application can convert a QR code image to display text, contact information, connect to a wireless network, or open a web page in the phone's browser.

BRIEF DESCRIPTION OF THE DRAWINGS

Various ones of the appended drawings merely illustrate example embodiments of the present disclosure and cannot be considered as limiting its scope.

FIG. 7 is a table describing a content retrieval method, in accordance with an example embodiment.

DETAILED DESCRIPTION

Figure 1:
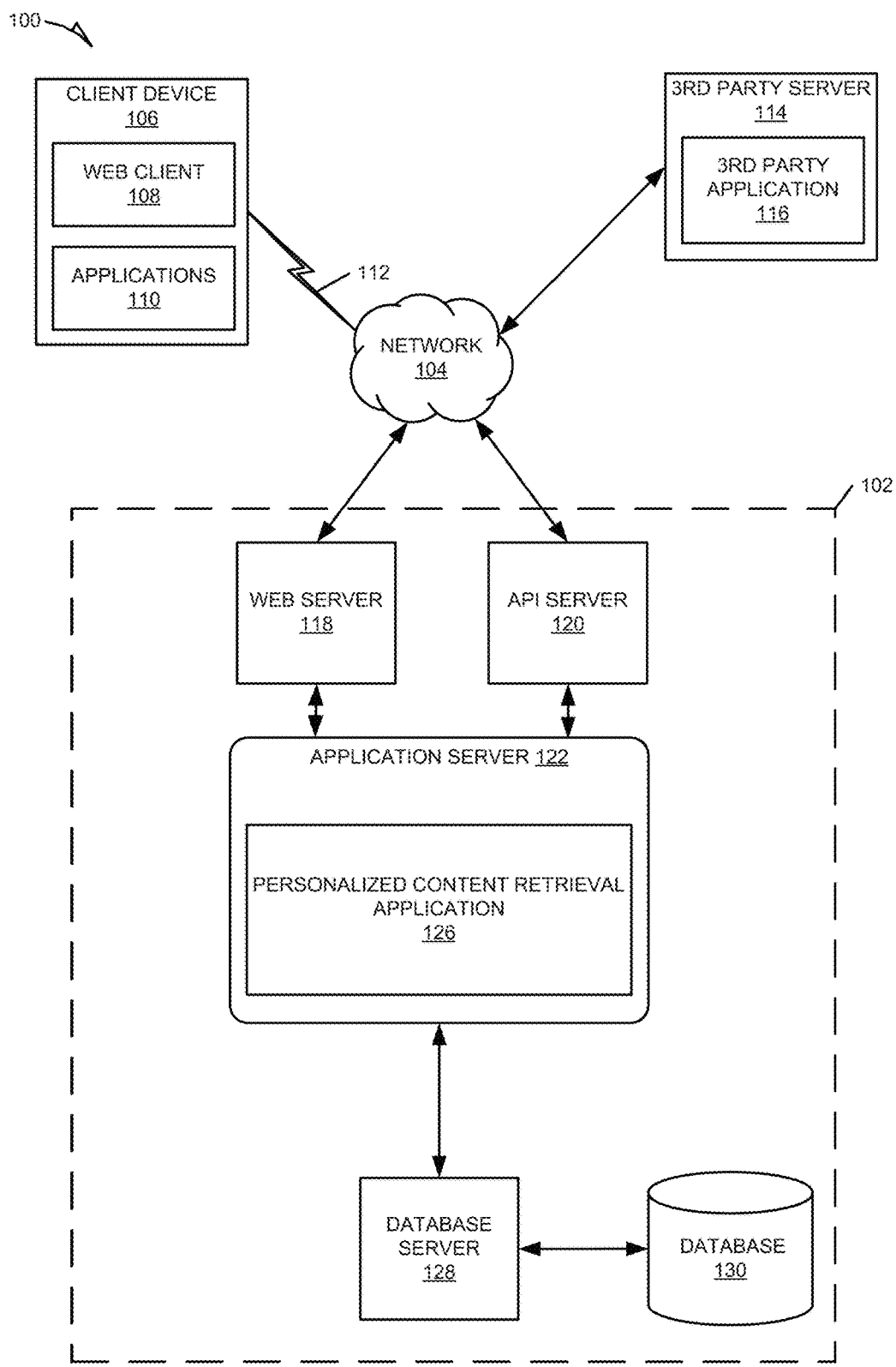
FIG. 1 is a network diagram depicting a network system having a client-server architecture configured for exchanging data over a network, according to an example embodiment.

Reference will now be made in detail to specific example embodiments for carrying out the inventive subject matter. Examples of these specific embodiments are illustrated in the accompanying drawings. It will be understood that these examples are not intended to limit the scope of the claims to the described embodiments. On the contrary, they are intended to cover such alternatives, modifications, and equivalents as may be included within the scope of the disclosure. In the following description, specific details are set forth in order to provide a thorough understanding of the subject matter. Embodiments may be practiced without some or all of these specific details. In accordance with the present disclosure, components, process steps, and data structures may be implemented using various types of operating systems, programming languages, computing platforms, computer programs, and/or general purpose machines.

Generally, content delivered through a scannable coded image, like a barcode or quick response (QR) code, is accessed without any prior identification or authentication of the user device. In an example embodiment, identification of a user device prior to delivering content corresponding to a scannable coded image enables a user to view personalized content, which in some instances could be exclusively accessed by a particular user device. For example, a scannable coded image such as a QR code may be printed on a label on the outside of a package and may correspond to content which identifies the contents of the package delivered to a user. The user may prefer that the contents of the box remain private. A method for identifying or authenticating the user responsive to scanning the coded image prior to delivering personalized content would therefore allow users to safely, quickly and easily access private or sensitive information through a scannable coded image.

Aspects of the present disclosure describe systems and methods for improvements to personalized content delivery on client devices. In an example embodiment, scannable coded images, such as quick response (QR) codes, may be generated corresponding to a particular transaction or user profile, wherein the coded image includes rules and limitations regarding what content may be accessed. Responsive to a user scanning the coded image to access its content, the user device, network and corresponding user profile may be identified before the corresponding content is delivered. In some example embodiments, the content delivered to the user device is personalized based on the corresponding user profile information, a transaction history associated with a user profile, and the coded image data including the rules and limitations regarding what content may be accessed. In the case where the content being delivered in response to the scanning of the scannable coded image is an advertisement, the personalization of the content may result in a higher conversion rate (e.g., the percentage of users who take a desired action) than if the content was not personalized. In further example embodiments, content may be personalized for users based on one or more identification attributes, wherein the identification attributes include user device information, user profile information, a transaction history, and authentication information, wherein the content is accessible through a scannable coded image. In accordance with the example embodiments, a variety of sources for data are combined to update and provide a profile for the user. For example, relevant identification attribute data is gathered responsive to a user scanning a scannable coded image This data is then stored in database entries associated with the user, which are then used to personalize content for the user.

FIG. 1 is a network diagram depicting a network system 100, according to one embodiment, having a client-server architecture configured for exchanging data over a network 104 (e.g., the Internet). While the network system 100 is depicted as having a client-server architecture, the present inventive subject matter is, of course, not limited to such an architecture, and could equally well find application in an event-driven, distributed, or peer-to-peer architecture system, for example. Further, to avoid obscuring the inventive subject matter with unnecessary detail, various functional components that are not germane to conveying an understanding of the inventive subject matter have been omitted from FIG. 1. Moreover, it shall be appreciated that although the various functional components of the network system 100 are discussed in the singular sense, multiple instances of any one of the various functional components may be employed.

The network system 100 may include a network-based content publisher 102 in communication with a client device 106 and a third party server 114. In some example embodiments, the network-based content publisher 102 may be a network-based marketplace (e.g., eBay.com). The network-based content publisher 102 may communicate and exchange data within the network system 100 that may pertain to various functions and aspects associated with the network system 100 and its users. The network-based content publisher 102 may provide server-side functionality, via the network 104, to network devices such as the client device 106.

The client device 106 may be operated by users who use the network system 100 to exchange data over the network 104. These data exchanges may include transmitting, receiving (communicating), and processing data to, from, and regarding content and users of the network system 100. The data may include, but are not limited to, images; video or audio content; user preferences; product and service feedback, advice, and reviews; product, service, manufacturer, and vendor recommendations and identifiers; product and service listings associated with buyers and sellers; product and service advertisements; users' incentives, like sweepstakes, awards, draws, discount and loyalty incentives (e.g. eBay Bucks, coupons); auction bids; transaction data; user profile data; and social data, among other things.

The client device 106 may interface with the network-based content publisher 102 via a connection with the network 104. Depending on the form of the client device 106, any of a variety of types of connections and networks 104 may be used. For example, the connection may be Code Division Multiple Access (CDMA) connection, a Global System for Mobile communications (GSM) connection, or another type of cellular connection. Such a connection may implement any of a variety, of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, or other data transfer technology (e.g., fourth generation wireless, 4G networks). When such technology is employed, the network 104 may include a cellular network that has a plurality of cell sites of overlapping geographic coverage, interconnected by cellular telephone exchanges. These cellular telephone exchanges may be coupled to a network backbone (e.g., the public switched telephone network (PSTN), a packet-switched data network, or other types of networks).

In another example, the connection to the network 104 may be a Wireless Fidelity (Wi-Fi, IEEE 602.11x type) connection, a Worldwide Interoperability fur Microwave Access (WiMAX) connection, or another type of wireless data connection. In such an embodiment, the network 104 may include one or more wireless access points coupled to a local area network (LAN), a wide area network (WAN), the Internet, or another packet-switched data network. In yet another example, the connection to the network 104 may be a wired connection (e.g., an Ethernet link), and the network 104 may be a LAN, a WAN, the Internet, or another packet-switched data network. Accordingly, a variety of different configurations are expressly contemplated.

In various embodiments, the data exchanged within the network system 100 may be dependent upon user-selected functions available through one or more client or user interfaces (UIs). The UIs may be associated with a client device, such as the client device 106 executing a web client 108 (e.g., an Internet browser), which may be in communication with the network-based content publisher 102. The UIs may also be associated with one or more applications 110 executing on the client device 106, such as a mobile application designed for interacting with the network-based content publisher 102 or with a social network platform hosted by the third party server 114.

Turning specifically to the network-based content publisher 102, an Application Program Interface (API) server 120 and a web server 118 are coupled to, and provide programmatic and web interfaces respectively to, an application server 122. As illustrated in FIG. 1, the application server 122 may be coupled via the API server 120 and the web server 118 to the network 104, for example, via wired or wireless interfaces. The application server 122 is, in turn, shown to be coupled to a database server 128 that facilitates access to a database 130. In some examples, the application server 122 can access the database 130 directly without the need for the database server 128. The database 130 may include multiple databases that may be internal or external to the network-based content publisher 102.

The application server 122 may, for example, host one or more applications, which may provide a number of content publishing and viewing functions and services to users who access the network-based content publisher 102. For example, the network-based content publisher 102 may host a marketplace application that provides a number of marketplace functions and services to users, such as publishing, listing, and price-setting mechanisms whereby a seller may list (or publish information concerning) goods or services (also collectively referred to as "products") for sale, a buyer can express interest in or indicate a desire to purchase such goods or services, and a price can be set for a transaction pertaining to the goods or services.

As illustrated in FIG. 1, the application server 122 hosts a personalized content retrieval application 126 that provides personalized advertisements and content and publishing services to users of the network-based content publisher 102. For example, the personalized content retrieval application 126 may receive requests from a user to view content by scanning a scannable coded image, or visiting a specified URL, and in turn, the personalized content retrieval application 126 may generate and facilitate the publication of personalized content to a user device. The personalized content retrieval application 126 may cause the content to be "published" in the sense that it is communicated, albeit through a variety of means, to a user device or other users or entities.

The content and advertisements generated and published by the personalized content retrieval application 126 may also include a reference to content (e.g., a link). As used herein, the terms "content" or "content item" refer to electronic data that is consumed by viewers (e.g., users) on displays, client devices, or page/display-based media (e.g., World-Wide Web (WWW) media embodied in browsers and accessible over the Internet). As such, the terms "content" and "content item" may refer to data associated with readable text, data associated with images, data associate with graphics, audio or video, programmatic content, scripts, or data corresponding to various combinations of these.

Consistent with some embodiments, users may utilize the personalized content retrieval application 126 to generate advertisements and content that are separate from and independent of any existing content. For example, users may utilize the personalized content retrieval application 126 to automatically generate a status update. Further, while the personalized content retrieval application 126 is shown in FIG. 1 to form part of the network-based content publisher 102, it will be appreciated that, in alternative embodiments, the personalized content retrieval application 126 may form part of a service that is separate and distinct from the network-based content publisher 102.

The database 130 may comprise a number of repositories used to store data pertaining to various functions and aspects associated with the network system 100 and its users. For example, the database 130 may include a repository to store and maintain user profiles for users of the network-based content publisher 102. Each user profile may comprise user profile data that describes aspects of a particular user. The user profile data may, for example, include location-based data, demographic data, user preferences, social data, network data, user device data, and financial information. The demographic data may, for example, include information describing one or more characteristics of a user such as gender, age, location information (e.g., hometown or current location), employment history, education history, contact information, familial relations, or user interests. The financial information may, for example, include private financial information of the user such as account number, credential, password, device identifier, user name, phone number, credit card information, bank information, transaction history, or other financial information which may be used to facilitate online transactions by the user.

The database 130 may also include a repository to store a record of user activity data. Accordingly, the network-based content publisher 102 may monitor, track, and record the activities of users utilizing one or more devices (e.g., the client device 106) to interact with the various components of the network system 100. Each user session may be maintained in a repository stored in the database 130. Accordingly, the user activity data may include past keyword searches that users have performed, web pages viewed by each user, products added to a user wish list or watch list, products added to an electronic shopping cart, and products that the users own. Consistent with some embodiments, the repository used to store records of user activity may be linked to the repository used to store user profile data so as to maintain an association of a user profile with the activities that the corresponding user has performed.

In instances in which the network-based content publisher 102 is a network-based marketplace, the database 130 may include a repository to store product information. Such product information may, for example, include a product identifier (e.g., a title or a model number), a price, a make, a manufacturer, a model, a brand name, a textual description, a size, a style, product dimensions, compatibility information, or any other information that may be used to describe a product. In these instances, the database 130 may also include a repository to store a transaction history of users of the network-based content publisher 102 that includes information related to transactions for products that may be offered for sale by merchants who utilize marketplace services provided by the network-based content publisher 102. The transaction history information may, for example, include a search history, or a description of an item or a product offered for sale, sold, or purchased by users, an identifier of the product, a category to which the product belongs, a purchase price, a purchase date, a purchased quantity, a number of bids for the product, or various combinations thereof, as well as location information corresponding to past transactions.

FIG. 1 also illustrates a third party application 116 executing on the third party server 114 that may offer information or services to the application server 122 or to users of the client device 106. The third party application 116 may have programmatic access to the network-based content publisher 102 via a programmatic interface provided by the API server 120. The third party application 116 may be associated with any organization that may conduct transactions with or provide services to the application server 122 or to users of the client device 106. For example, the third party application 116 may be associated with a network based social network platform (e.g., Facebook®, Twitter®, Google Pinterest®, LinkedIn®, or the like) that may provide a platform for members to build and maintain social networks and relations among members.

Figure 2:
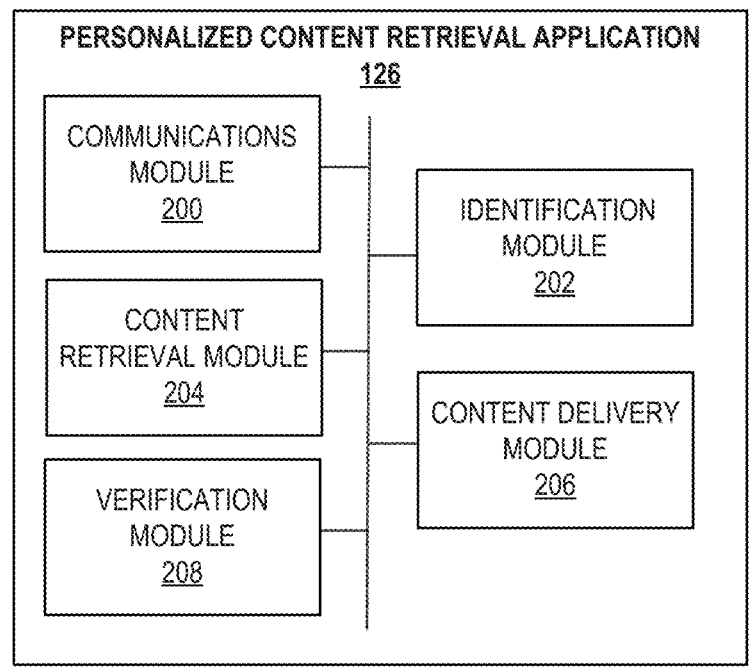
FIG. 2 is a block diagram illustrating an example embodiment of multiple modules forming a content personalization application, which is provided as a part of the network system of FIG. 1, in accordance with an example embodiment.

FIG. 2 is a block diagram illustrating various functional modules of the personalized content retrieval application 126, which is provided as part of the network system 100, consistent with some embodiments. The personalized content retrieval application 126 is shown as including a communications module 200, an identification module 202, a content retrieval module 204, a content delivery module 206, and a verification module 208, all configured to communicate with each other (e.g., via a bus, shared memory, a switch, or APIs). The various modules of the personalized content retrieval application 126 may, furthermore, access the database 130 via the database server 128, and each of the various modules of the personalized content retrieval application 126 may be in communication with one or more of the third part applications 116 (e.g., an online marketplace). Further, white the modules of FIG. 2 are discussed in the singular sense, it will be appreciated that in other embodiments multiple modules may be employed.

The communications module 200 is configured to facilitate communicate between the client device 106, the network 104, and the $3^{rd}$ party server 114. In some embodiments, the communications module 200 is configured to receive an indication that a scannable coded image has been scanned by a client device 106, wherein the indication includes scannable coded image data.

The identification module 202 is configured to identify a user of the client device 106. The identification module 202 may identify a user based on one or more identification attributes including, a user profile with login credentials, wherein the login credentials may include a username and password and/or a fingerprint scan, as well as based on data corresponding to the client device 106 itself.

For example, the identification module 202 may be configured to authenticate a user device in order to grant access to specific content corresponding to the scannable coded image. In some embodiments, in response to the user device scanning a scannable coded image, the identification module 202 may communicate to the communications module 200 to deliver a login request to the user device in order to authenticate the user. The login request includes a username and password as well as, in some embodiments, a fingerprint scan request on enabled devices.

In other embodiments, the identification module 202 identifies a client device 106 based on one or more identification attributes associated with the client device 106. Often, user devices include corresponding identification information which may be used to identify the device. A device fingerprint is information collected about a remote computing device, such as client device 106, for the purpose of identification. Device fingerprinting methods range from passive to active. Passive fingerprinting occurs without a need to query the user device. Passive methods rely upon precise classification of such factors as the client device 106 Transmission Control Protocol/Internet Protocol (TCP/IP) configuration, Operating System (OS) fingerprint, IEEE 802.11 settings, and hardware clock skew. Alternatively, Active fingerprinting assumes the client will tolerate some degree of invasive querying. The most active method is installation of executable code directly on the client machine. Such code may have access to attributes not typically available by other means, such as the Media Access Control (MAC) Address, or other unique serial numbers assigned to the machine hardware. For example, the identification module 202 may be configured to identify a client device 106 through either active or passive means of device fingerprinting, In some embodiments, the identification module 202 is configured to identify the client device 106 upon a user attempting to access personalized content via a scannable coded image. For example, responsive to receiving an indication that the scannable coded image has been scanned by the user device, the identification module 202 gathers corresponding user profile information, and device identification information and compares the data with information stored in the database 130.

In further embodiments, the identification module 202 is configured to pre-authenticate a particular user device or user profile. For example, before scanning a coded image, a user may enter login credentials corresponding to a particular user profile on the user device. Upon scanning the coded image, the user device may transmit the coded image data along with the authentication information to the identification module 202. Upon receiving the authentication information, the identification module 202 may then identify the user device based on the corresponding user profile login credentials.

In even further embodiments, an authentication or identification request is included as a piece attic content corresponding to the scannable coded image. For example, responsive to scanning the scannable coded image, the user device may automatically be directed to a login or identification page, where a user must enter their login credentials in order to view the remainder of the content associated with the scannable coded image.

The content retrieval module 204 is configured to retrieve personalized content accessed through the scannable coded image, based on information gathered by the identification module 202. For example, the content retrieval module 204 analyzes the data gathered by the identification module 202, and uses the data to retrieve personalized content based on the user and the scannable coded image data. In some embodiments, the scannable coded image data may include information associated with a recent transaction between users, such as a shipping or packing list accessible only by the transacting users. The content retrieval module 204 may retrieve the packing list upon receiving identification information corresponding to the user.

In some embodiments, the content retrieval module may dynamically determine the personalized content to retrieve based on the collected user profile information. For example, the user profile information may include a user transaction history and past search queries by the user. The content retrieval module 204 may then use the information to gather similar product listings, advertisements, coupons, or other content based on the user profile information.

The content delivery module 206 is configured to deliver the content retrieved by the content retrieval module 204. In some embodiments the content delivery module 206 may deliver the content in the form of a push notification delivered directly the client device 106. In other embodiments, the content delivery module 206 may deliver the personalized content as an email or text message.

In some embodiments the personalized content retrieval application 126 includes a verification module 208. The verification module 208 verifies the identification by the identification module 202 based on location and network data. For example, responsive to the identification module 202 identifying a user, the verification module 208 gathers location and network information corresponding to the client device 106, and compares the information to data stored in the database 130 in order to verify that the client device 106 is not stolen or being used by someone other than the identified user. For example, a user profile may include location information corresponding to user which may be used to compare with the existing location information. In instances where the location of the user device does not match the existing data in the database 130, a login request may be delivered to the client device 106 in order to receive further authentication that the user is in fact the user identified by the identification module 202.

In an example consistent with embodiments discussed above, a scannable coded image may have been generated corresponding to a specific transaction between two users, and attached to a package to be delivered to the purchasing user. Upon receipt of the package, the user may then scan the scannable coded image with an enabled device in order to access personalized content. The communications module 200 delivers an indication that the scannable coded image has been scanned by a user device. Responsive to this indication, the identification module 202 gathers user profile information from the user device, which may include login information and device data, in order to identify the user. The identified user may then be verified by the verification module 208, based on their current location information. The information gathered by the identification module would then be delivered to the content retrieval module 204, where the information is used to retrieve the personalized content. Here, since the package delivered to the user included a specific scannable coded image, the content retrieval module 204 may be configured to retrieve personalized content which includes a packing list and shipping information corresponding to the specific transaction. Alternatively, the content retrieval module 204 could dynamically retrieve content based on the user profile information. The personalized content could then be delivered to the user device by the content delivery module 206.

Figure 3:
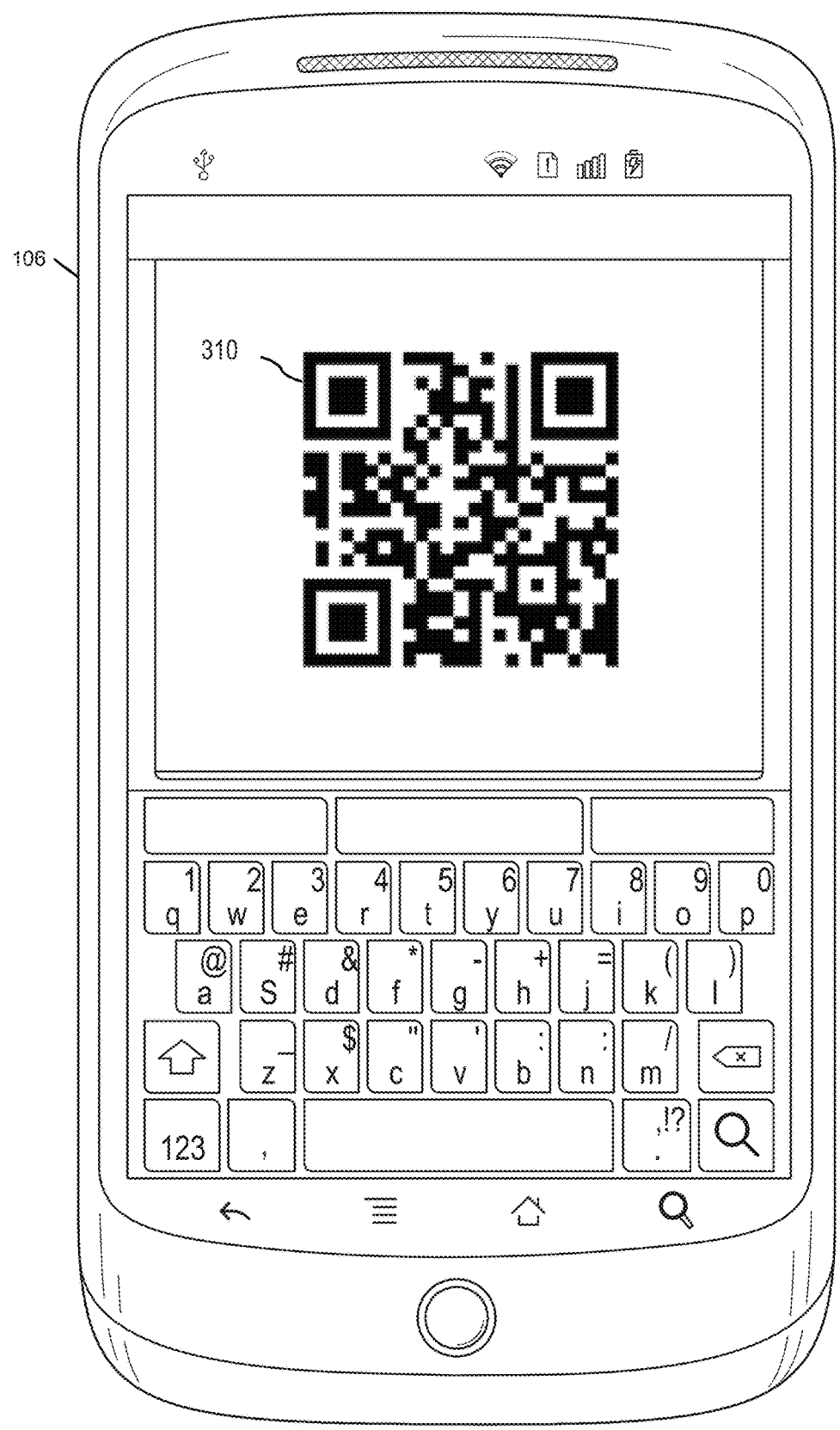
FIG. 3 is an interface diagram depicting an example user device accessing the contents of a scannable coded image, such as a QR code, consistent with some example embodiments.

FIG. 3 is an interface diagram representing a user device, such as the client device 106 of FIG. 1, scanning a scannable coded image 310. The scannable coded image 310 may be located on a flier, product, or package which may be scanned by the client device 106. For example, during an online transaction between a buyer and a seller, the seller may attach the scannable coded image onto a package or document which may then be delivered to the buyer. The buyer can then scan the scannable coded image 310 with an enabled client device 106 in order to access personalized content corresponding to the scannable coded image 310. Consistent with example embodiments described above, a seller may choose to personalize content associated with the scannable coded image 310, or alternatively, the personalized content retrieval application 126 may automatically generate the corresponding personalized content associated with the scannable coded image 310.

Figure 4:
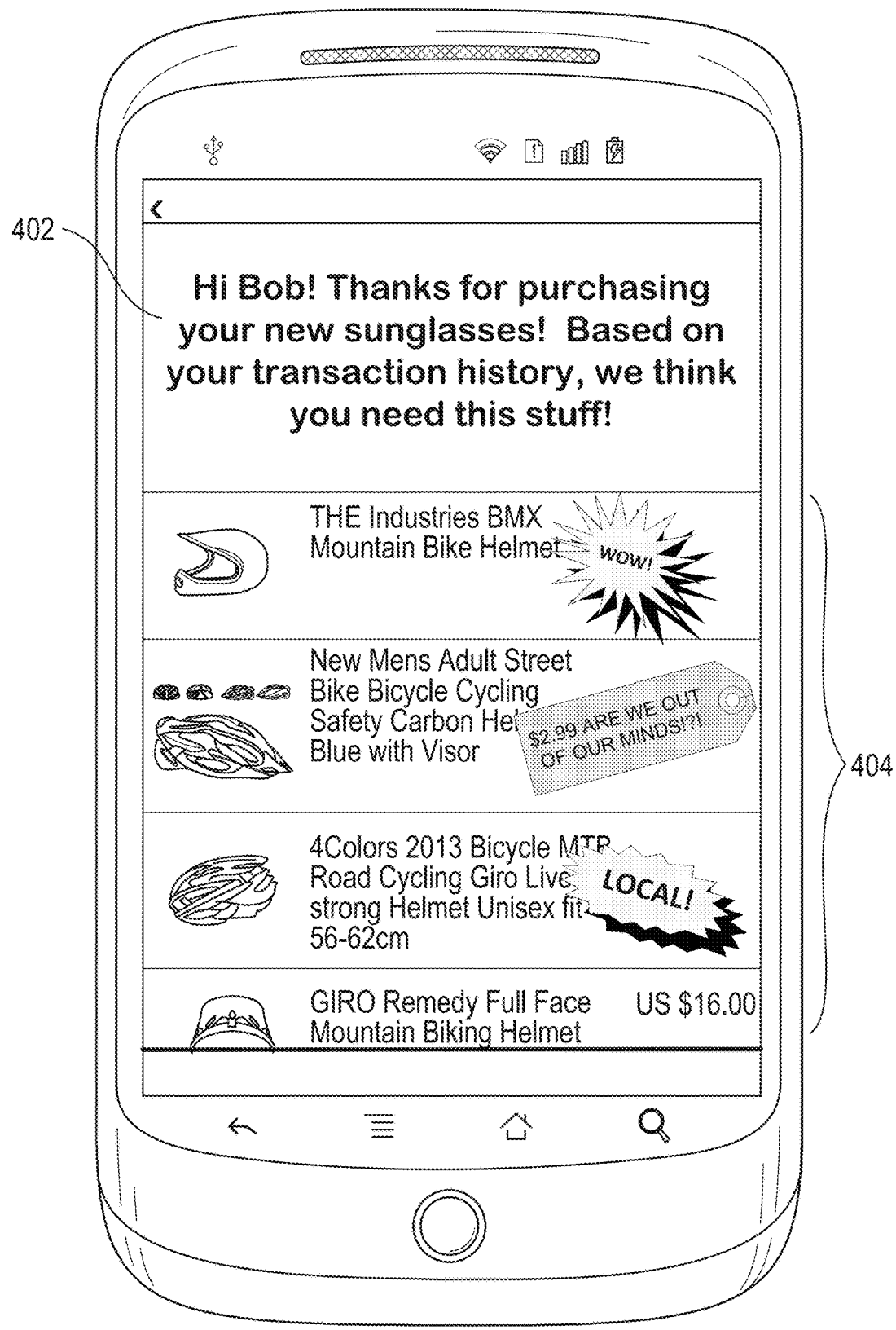
FIG. 4 is an interface diagram depicting personalized content delivered to the user device, in response to an identification of the user device, in accordance with an example embodiment.

FIG. 4 is an interface diagram representing personalized content 402 retrieved by the content retrieval module 204. The personalized content 402 may comprise advertisements 404, wherein the advertisements 404 are related to a transaction history associated with a user profile. The personalization module 204 may generate the personalized content 402 based on a user transaction history, user search queries, and social media activity. Responsive to receiving a notification that a scannable coded image has been accessed by a user device, the identification module 202 identifies the user device and gathers corresponding user profile information. After identification of the user device, the personalized content may be retrieved by the content retrieval module 204. FIG. 4 illustrates a list of product listings within an online marketplace which may appeal to a user based on the their past transactions and purchasing behavior, as well as other attributes associated with the user, including birthdate, preferences, gender, demographics, as well as the user device, including location information, device information, and network information.

Figure 5:
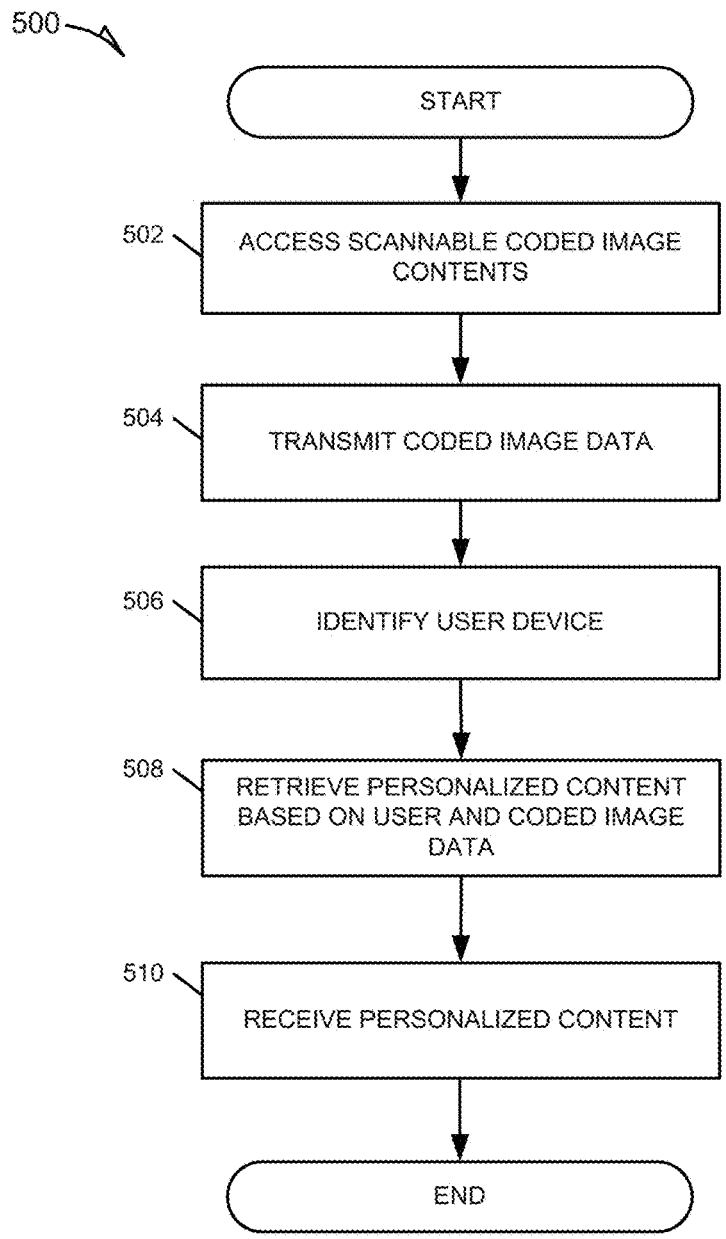
FIG. 5 is a flowchart illustrating a method for authenticating a user device and accessing personalized content with the authenticated user device via a scannable coded image, in accordance with an example embodiment.

FIG. 5 is a flowchart illustrating a method 500 for accessing personalized content with an enabled user device, through a scannable coded image, consistent with embodiments discussed herein. A user may receive a package or flier which includes a scannable coded image. The user may attempt to access the corresponding contents of the scannable coded imagee by scanning the code enabled device.

At operation 502, responsive to accessing the contents of the scannable coded image, the communications module 200 transmits the corresponding coded image data of the scannable coded image to the personalized content retrieval application 126. At operation 504, responsive to scanning the scannable coded image, the communication module 200 delivers an indication that the scannable coded image has been accessed to the identification module 202.

At operation 506, the identification module 202 identifies the user of the user device based on user profile information and user device information. The verification module 208 verifies the user based on location and network data. At operation 508, the content retrieval module 204 retrieves the corresponding personalized content based on the user and the scannable coded image data. The content retrieval module 204 may also dynamically retrieve content based on user profile information, such as a transaction history.

At operation 510, the personalized content is delivered to the user device by the content delivery module 206. The content may be delivered as a push notification, as an email, or as a text message.

Figure 6:
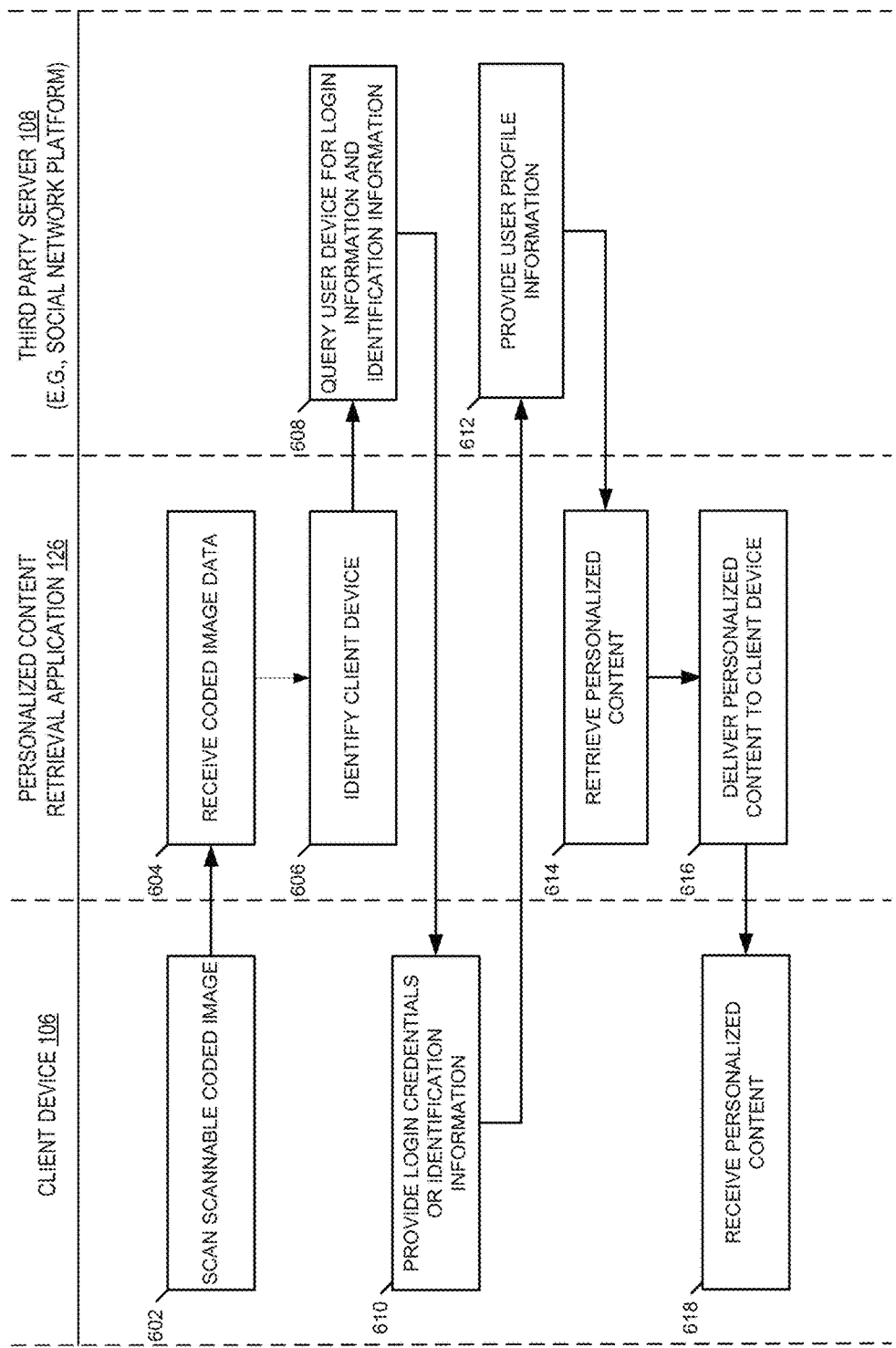
FIG. 6 is an interaction diagram depicting example exchanges between a client device, an application server, and a third party server, consistent with some example embodiments.

FIG. 6 is an interaction diagram depicting example exchanges between a client device, an application server, and a third party server, consistent with some embodiments. In particular, FIG. 6 depicts example exchanges between the client device 106, the personalized content retrieval application 126, and the third party server 108, which in this example embodiment, corresponds to an online marketplace e.g., ebay.com). As shown, at operation 602, the client device 106 (the user of which is referred to as the "requesting user" or "requestor") transmits a request to access the contents of a scannable coded image, such as a QR code, by scanning the QR code with an enabled device.

At operation 604, the personalized content retrieval application 126 receives the indication that the scannable coded image has been scanned by an enabled user device, and at operation 606 seeks to identify the user device prior to delivering the corresponding personalized content. In order to identify the client device, the personalized content retrieval application 126 queries the third party server 108 in order to gather login and user profile information corresponding to the user device.

Responsive to receiving an identification request for a particular user device, the third party server 108 queries the user device for login information or other identification information including location information, device information, and network information. In some embodiments the third party server 108 may transmit a login request to the client device 106. In further embodiments, the personalized content retrieval application 126 may verify the identification through location or network information corresponding to the user device.

At operation 610, the client device 106 receives the identification request from the third party server 108 and provides login credentials and identification information corresponding to the user device. In some embodiments the client device 106 may store login information to enable the client device 106 to respond to automatically respond to the query request from the third party server 108 without user interaction. In other embodiments the login information may be provided by a user. In further embodiments, the client device 106 may provide location information corresponding to the location of the user device at the time of receiving the request, device information identifying the device, and network information corresponding to the particular network which the device is communicating through. The login credentials and identification information may then be communicated to the third party server 108 in order to identify the client device 106.

At operation 612, responsive to receiving the user profile and identification information, the third party server 108 provides the data to the personalized content retrieval application 126 in order to retrieve content to deliver to the client device 106. At operation 614, the personalized content retrieval application 126 receives the user profile information and identification information to generate personalized content. In some embodiments the retrieval of the personalized content may be based on a transaction history and recent search query history associated with a user profile. In other embodiments the personalization may be based on the user and the scannable coded image data. For example, by basing the personalization on a transaction history, the content retrieved by the content retrieval module 204 may comprise a collection of listings related to recent purchases or searches associated with a user profile. At operation 616 the personalized content is delivered to the client device 106 for consumption by a user. At operation 618, the client device receives the personalized content.

FIG. 7 is a table 700 illustrating the different content which may be retrieved by the content retrieval module 204, based on the user and scannable coded image data. The table 700 has three columns: a column 702 corresponding to four different scannable coded images, such as QR codes QR1-QR4; a column 704 corresponding to five different users, USER ID1-USER ID5; and a column 706 corresponding to 6 possible content outcomes.

For example, the chart illustrates that when a user associated with USER ID1 accesses the contents of scannable coded image, QR1, the content retrieval module 204 retrieves CONTENT A. However, when a user associated with USER ID2 attempts to access the content of QR1, USER ID2 is instead delivered CONTENT B. Similarly, when the user associated with USER ID3 accesses the content of QR1, the content retrieval module 204 retrieves CONTENT C. In this way, the personalized content retrieval application 126 may retrieve and deliver different content based on the user and the scannable coded image data.

FIG. 7 also depicts a scenario where a user accesses the content of coded image QR4, and the content retrieval module 204 dynamically retrieves content based on the user profile information, such as transaction history, corresponding to USER ID5.

Example Mobile Device

Figure 8:
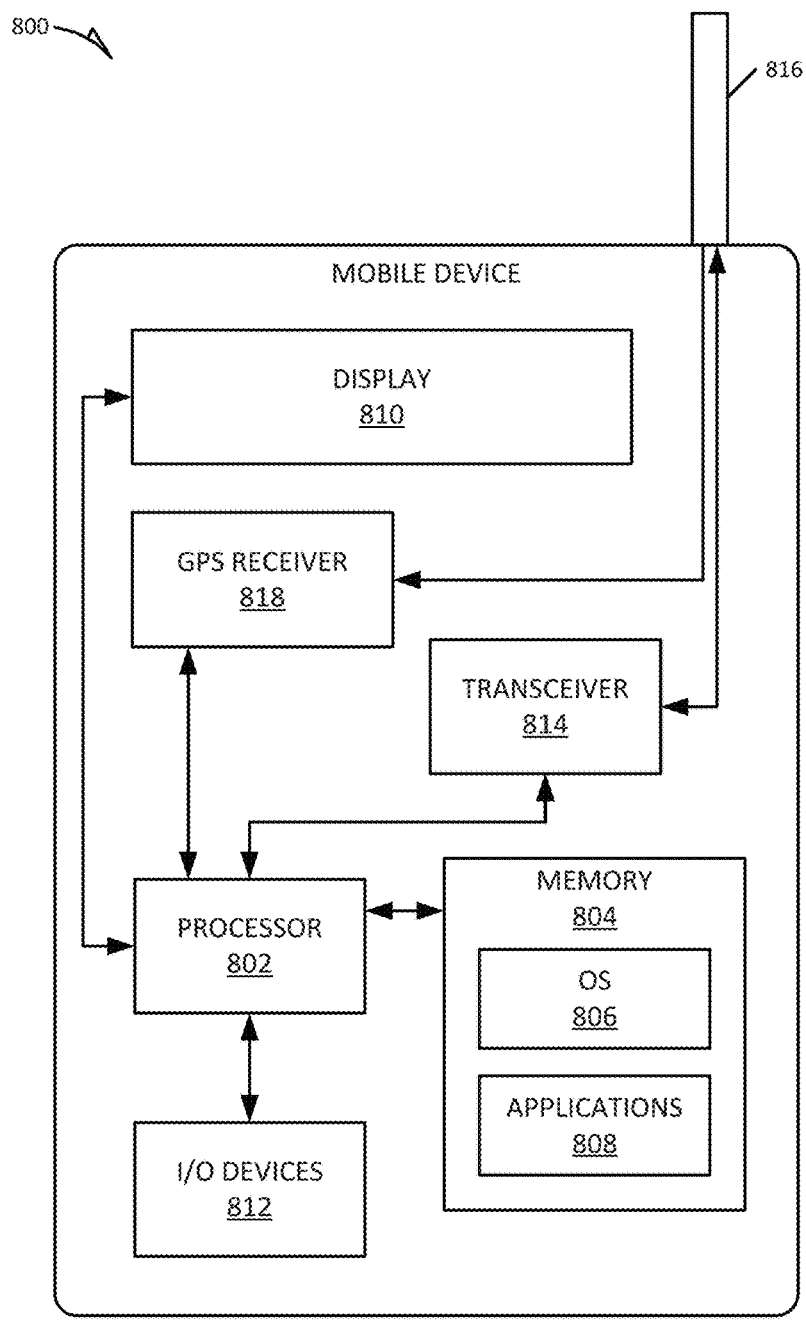
FIG. 8 illustrates an exemplary mobile device, according to various example embodiments.

FIG. 8 is a block diagram illustrating a mobile device 800, according to an example embodiment. The mobile device 800 may include a processor 802. The processor 802 may be any of a variety of different types of commercially available processors suitable for mobile devices (for example, an XScale architecture microprocessor, a microprocessor without interlocked pipeline stages (MIPS) architecture processor, or another type of processor 802). A memory 804, such as a random access memory (RAM), a flash memory, or other type of memory, is typically accessible to the processor 802. The memory 804 may be adapted to store an operating system (OS) 806, as well as applications 808, such as a mobile location-enabled application that may provide location-based services (LBSs) to a user. The processor 802 may be coupled, either directly or via appropriate intermediary hardware, to a display 810 and to one or more input/output (I/O) devices 812, such as a keypad, a touch panel sensor, a microphone, and the Similarly, in some embodiments, the processor 802 may be coupled to a transceiver 814 that interfaces with an antenna 816. The transceiver 814 may be configured to both transmit and receive cellular network signals, wireless data signals, or other types of signals via the antenna 816, depending on the nature of the mobile device 800. Further, in some configurations, a GPS receiver 818 may also make use of the antenna 816 to receive GPS signals.

Modules, Components and Logic

Certain embodiments are described herein as including logic or a number of components, modules, or mechanisms. Modules may constitute either software modules (e.g., code embodied (1) on anon-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client or server computer system) or one or more processors 802 may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field-programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations, it will be appreciated that the decision to implement a hardware-implemented module mechanically, in dedicated and permanently configured circuitry, or in temporarily configured circuitry e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure the processor 802, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information), The various operations of example methods described herein may be performed, at least partially, by one or more processors 802 that are temporarily configured (e.g., by software) or permanently configured to perform the relevant operations. Whether temporarily or permanently configured, such processors 802 may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors 802 or processor-implemented modules. The performance of certain of the operations may be distributed among the one or more processors 802, not only residing within a single machine, but deployed across a number of machines. In some example embodiments, the processor 802 or processors 802 may be located in a single location (e.g., within a home environment, an office environment, or a server farm), while in other embodiments the processors 802 may be distributed across a number of locations.

The one or more processors 802 may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs)).

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor 802, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors 802 executing a computer program to perform functions by operating on input data and generating output. Method operations can also be performed by, and apparatus of example embodiments may be implemented as, special-purpose logic circuitry, e.g., a field-programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor 802), or in a combination of permanently and temporarily configured hardware may be a design choice. Below are set out hardware (e.g., machine) and software architectures that may be deployed, in various example embodiments.

Example Machine Architecture and Machine-Readable Medium

Figure 9:
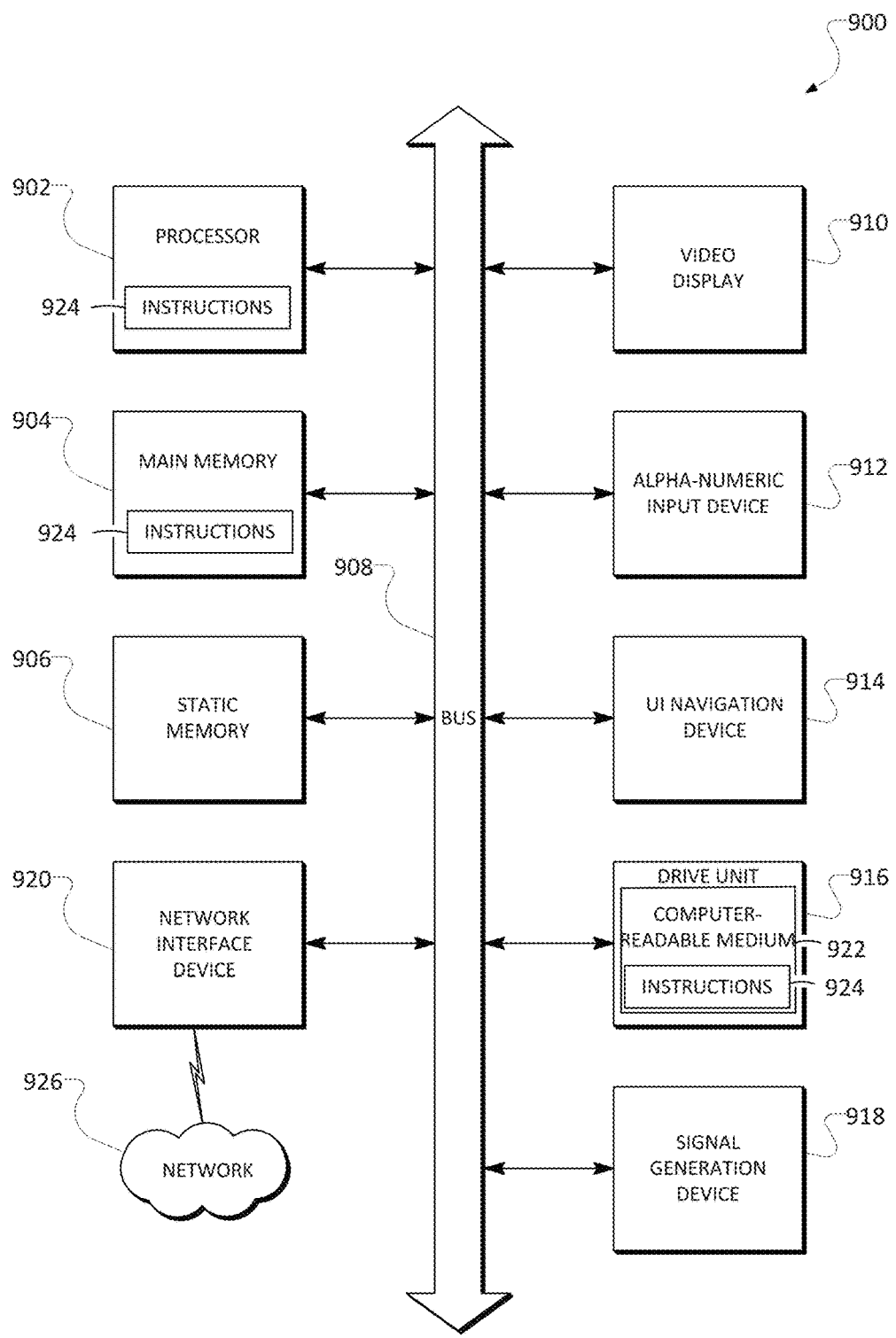
FIG. 9 is a diagrammatic representation of a machine in the example form of a computer system within which a set of instructions, for causing the machine to perform any one or more of the methodologies discussed herein, may be executed.

FIG. 9 is a block diagram of a machine in the example form of a computer system 900 within which instructions 924 may be executed for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch or bridge, or any machine capable of executing instructions (sequential or otherwise) that specify actions to be taken by that machine. Further, while only a single machine is illustrated, the term "machine"shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a graphics processing unit (CPU), or both), a main memory 904 and a static memory 906, which communicate with each other via a bus 908. The computer system 900 may further include a video display 910 (e.g., a liquid crystal display (LCD) or a cathode ray tube (CRT)). The computer system 900 also includes an alphanumeric input device 912 (e.g., a keyboard or a touch-sensitive display screen), a user interface (UI) navigation (e.g., cursor control) device 914 (e.g., a mouse), a drive unit 916, a signal generation device 918 (e.g., a speaker) and a network interface device 920.

Machine-Readable Medium

The drive unit 916 includes a computer-readable medium 922 on which is stored one or more sets of data structures and instructions 924 (e.g., software) embodying or utilized by any one or more of the methodologies or functions described herein. The instructions 924 may also reside, completely or at least partially, within the main memory 904 and/or within the processor 902 during execution thereof by the computer system 900, the main memory 904 and the processor 902 also constituting computer-readable media 922.

While the computer-readable medium 922 is shown in an example embodiment to be a single medium, the term "computer-readable medium" may include a single medium or multiple media (e.g., a centralized or distributed database, and/or associated caches and servers) that store the one or more instructions 924 or data structures. The term "computer-readable medium" shall also be taken to include any tangible medium that is capable of storing, encoding or carrying instructions 924 for execution by the machine and that cause the machine to perform any one or more of the methodologies of the present disclosure, or that is capable of storing, encoding or carrying data structures utilized by or associated with such instructions 924. The term "computer-readable medium" shall accordingly be taken to include, but not be limited to, solid-state memories, and optical and magnetic media. Specific examples of computer-readable media 922 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

Transmission Medium

The instructions 924 may further be transmitted or received over a network 926 using a transmission medium. The instructions 924 may be transmitted using the network interface device 920 and any one of a number of well-known transfer protocols (e.g., HTTP). Examples of communication networks include a local area network ("LAN"), a wide area network ("WAN"), the Internet, telephone networks, plain old telephone (POTS) networks, and wireless data networks (e.g., WiFi and WiWAX networks). The term "transmission medium" shall be taken to include any intangible medium that is capable of storing, encoding or carrying instructions 924 for execution by the machine, and includes digital or analog communications signals or other intangible media to facilitate communication of such software.

Although the inventive subject matter has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

FIG. 9 is a diagrammatic representation of a machine in the example form of a computer system 900 within which a set of instructions for causing the machine to perform any one or more of the methodologies discussed herein may be executed. The computer system 900 may correspond to the client device 106, the third party server 114, the API server 120, the web server 118, or the application server 122, consistent with some embodiments. The computer system 900 may include instructions for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a personal digital assistant (PDA), a cellular telephone, a smart phone (e.g., iPhone®), a tablet computer, a web appliance, a handheld computer, a desktop computer, a laptop or netbook, a set-top box (STB) such as those provided by cable or satellite content providers, a wearable computing device such as glasses or a wristwatch, a multimedia device embedded in an automobile, a Global Positioning System (GPS) device, a data enabled book reader, a video game system console, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a graphics processing unit (GPU), or both), a main memory 904, and a static memory 906, which communicate with each other via a bus 908. The computer system 900 may further include a video display 910 (e.g., a liquid crystal display (LCD) or a cathode ray tube (CRT)). The computer system 900 also includes one or more input/output (I/O) devices 912, a UI navigation device 914, a drive unit 916, a signal generation device 918 (e.g., a speaker), and a network interface device 920. The I/O devices 912 may, for example, include a keyboard, a mouse, a keypad, a multi-touch surface (e.g., a touchscreen or track pad), a microphone, a camera, and the like.

The UI navigation device 914 may be used for determining a location of the computer system 900. In some embodiments, the UI navigation device 914 may correspond to a GPS transceiver that may make use of the network interface device 920 to communicate GPS signals with a GPS satellite. The UI navigation device 914 may also be configured to determine a location of the computer system 900 by using an Internet Protocol (IP) address lookup or by triangulating a position based on nearby mobile communications towers. The UI navigation device 914 may be further configured to store a user-defined location in the main memory 904 or the static memory 906. In some embodiments, a mobile location enabled application may work in conjunction with the UI navigation device 914 and the network interface device 920 to transmit the location of the computer system 900 to an application server or third party server for the purpose of identifying the location of a user operating the computer system 900.

In some embodiments, the network interface device 920 may correspond to a transceiver and antenna. The transceiver may be configured to both transmit and receive cellular network signals, wireless data signals, or other types of signals via the antenna, depending on the nature of the computer system 900.

What is claimed is:

1. A system comprising:
   one or more processors of a machine; and
   a memory storing instructions that, when executed by at least one processor among the one or more processors, cause the machine to perform operations comprising:
   detecting user activity of a user, the user activity including a transaction conducted by the user for an item, the user having an associated user profile that includes a location identifier that identifies a location associated with the user, a device identifier that identifies a user device associated with the user, and one or more of demographic data, user preferences, gender, age, or financial information;

encoding a scannable coded image including a two-dimensional matrix with personalized content specific to the user and authentication criteria in response to detecting the transaction conducted by the user, the authentication criteria being based on the user profile of the user, and the personalized content including an identification of the item associated with the transaction conducted by the user, the scannable coded image being further associated with at least one additional user and additional personalized content specific to the at least one additional user;

receiving a request to access the personalized content of the scannable coded image, the request initiated in direct response to a requesting device scanning the scannable coded image, the request including at least current location data and device data;

accessing the user profile associated with the authentication criteria in response to receiving the request;

authenticating the request based on the authentication criteria, the current location data, the device data, the location identifier, and the device identifier;

responsive to authenticating the request, retrieving the personalized content that includes identification of the item associated with the transaction conducted by the user; and causing display of the identification of the item on the requesting device.

2. The system of claim 1 wherein authenticating the request is based on login credentials associated with the user profile of the user.

3. A method comprising:

detecting user activity of a user, the user activity including a transaction conducted by the user for an item, the user having an associated user profile that includes a location identifier that identifies a location associated with the user, a device identifier that identifies a user device associated with the user, and one or more of demographic data, user preferences, gender, age, or financial information;

encoding a scannable coded image including a two-dimensional matrix with personalized content specific to the user and authentication criteria in response to detecting the transaction conducted by the user the authentication criteria being based on the user profile of the user, and the personalized content including an identification of the item associated with the transaction conducted by the user, the scannable coded image being further associated with at least one additional user and additional personalized content specific to the at least one additional user;

receiving a request to access the personalized content of the scannable coded image, the request initiated in direct response to a requesting device scanning the scannable coded image, the request including at least current location data and device data;

accessing the user profile associated with the authentication criteria in response to receiving the request;

authenticating the request based on the authentication criteria, the current location data, the device data, the location identifier, and the device identifier;

responsive to authenticating the request, retrieving the personalized content that includes identification of the item associated with the transaction conducted by the user; and causing display of the identification of the item on the requesting device.

4. The method of claim 3, wherein the request is authenticated based on login credentials associated with the user profile of the user.

5. The method of claim 3 further comprising:

responsive to receiving the request to access the personalized content of the scannable coded image, retrieving user profile information; and determining the personalized content to retrieve based on the user profile information.

6. The method of claim 3 further comprising:

responsive to receiving the request to access the personalized content, transmitting a login request to the requesting device, wherein authenticating the request is based on login information received in response to the login request.

7. The method of claim 3 wherein:

receiving the request to access the personalized content is triggered based on instructions executed by the requesting device, the instructions being included in the scannable coded image.

8. The method of claim 3, wherein:

the request is authenticated by gathering corresponding identification information, wherein the identification information includes user profile information and network information.

9. A non-transitory computer-readable medium embodying instruction that, when executed by one or more processors of a machine, cause the machine to perform operations comprising:

detecting user activity of a user, the user activity including a transaction conducted by the user for an item, the user having an associated user profile that includes a location identifier that identifies a location associated with the user, a device identifier that identifies a user device associated with the user, and one or more of demographic data, user preferences, gender, age, or financial information;

encoding a scannable coded image including a two-dimensional matrix with personalized content specific to the user and authentication criteria in response to detecting the transaction conducted by the user, the authentication criteria being based on the user profile of the user, and the personalized content including an identification of the item associated with the transaction conducted by the user, the scannable coded image being further associated with at least one additional user and additional personalized content specific to the at least one additional user;

receiving a request to access the personalized content of the scannable coded image, the request initiated in direct response to a requesting device scanning the scannable coded image, the request including at least current location data and device data;

accessing the user profile associated with the authentication criteria in response to receiving the request;

authenticating the request based on the authentication criteria, the current location data, the device data, the location identifier, and the device identifier;

responsive to authenticating the request, retrieving the personalized content that includes identification of the item associated with the transaction conducted by the user; and causing display of the identification of the item on the requesting device.

10. The non-transitory computer-readable medium of claim 9, wherein the operations further comprise:
   authenticating the request based on login credentials associated with the user profile of the user.

11. The non-transitory computer-readable medium of claim 9, wherein the operations further comprise:
   responsive to receiving the request to access the personalized content, retrieving user profile information; and
   determining the personalized content to retrieve based on the user profile information.

12. The non-transitory computer-readable medium of claim 9, wherein the operations further comprise:
   responsive to receiving the request to access the personalized content, transmitting an identification message to the requesting device.

13. The non-transitory computer-readable medium of claim 9, wherein:
   receiving the request to access the personalized content is triggered based on instructions included in the scannable coded image.

14. The non-transitory computer-readable medium of claim 9, wherein:
   the requesting device is identified by gathering corresponding identification information, wherein the identification information includes user profile information, location information, device information, and network information.

15. The system of claim 1, wherein the personalized content specific to the user is not displayed on the requesting device if the request is not authenticated.

16. The method of claim 3, wherein the personalized content specific to the user is not displayed on the requesting device if the request is not authenticated.

17. The non-transitory computer-readable medium of claim 9, wherein the personalized content specific to the user is not displayed on the requesting device if the request is not authenticated.

* * * * *

UNITED STATES PATENT AND TRADEMARK OFFICE
CERTIFICATE OF CORRECTION

PATENT NO. : 10,178,166 B2
APPLICATION NO. : 14/563078
DATED : January 8, 2019
INVENTOR(S) : Yotam Sharan Page 1 of 1

It is certified that error appears in the above-identified patent and that said Letters Patent is hereby corrected as shown below:

In the Claims

In Column 17, Line 31, in Claim 2, delete "claim 1" and insert -- claim 1, --, therefor.

In Column 17, Line 46, in Claim 3, delete "user" and insert -- user, --, therefor.

Signed and Sealed this
Twenty-first Day of July, 2020

Andrei Iancu
*Director of the United States Patent and Trademark Office*